United States Patent
Lee

(10) Patent No.: US 7,522,126 B2
(45) Date of Patent: Apr. 21, 2009

(54) VIDEO DISPLAY APPLIANCE AND SIGNAL PROCESSING APPARATUS DETACHABLY CONNECTED THERETO

(75) Inventor: Kwang Min Lee, Ulsan (KR)

(73) Assignee: LG Electronics Inc., Seoul (KR)

( * ) Notice: Subject to any disclaimer, the term of this patent is extended or adjusted under 35 U.S.C. 154(b) by 891 days.

(21) Appl. No.: 10/704,981

(22) Filed: Nov. 12, 2003

(65) Prior Publication Data

US 2004/0096187 A1    May 20, 2004

(30) Foreign Application Priority Data

Nov. 13, 2002   (KR) .................... 10-2002-0070409
Apr. 4, 2003    (KR) .................... 10-2003-21454

(51) Int. Cl.
*G09G 5/00*   (2006.01)

(52) U.S. Cl. .................. 345/3.1; 345/3.4; 345/660

(58) Field of Classification Search ............ 345/1.1, 345/3.1–3.4, 211, 204, 698, 699, 660
See application file for complete search history.

(56) References Cited

U.S. PATENT DOCUMENTS 6,348,931 B1 *  2/2002  Suga et al. ............... 345/699
6,587,101 B2 *  7/2003  Yoo .......................... 345/211
6,670,964 B1 * 12/2003  Ward et al. ............... 345/660
7,007,159 B2 *  2/2006  Wyatt ........................ 713/1
2003/0043140 A1 * 3/2003  Ko et al. ................... 345/211
2003/0142240 A1 * 7/2003  Masters .................... 348/720

FOREIGN PATENT DOCUMENTS

CN    2464029    12/2001
JP    04-324492  11/1992

* cited by examiner

*Primary Examiner*—Kevin M Nguyen
(74) *Attorney, Agent, or Firm*—KED & Associates, LLP

(57) ABSTRACT

Disclosed is a video display appliance from which a video signal processing unit and a PC signal processing unit are separated and to which the separated signal processing units are detachably connected or connected by a communication cable. The video display appliance includes an interface receiving a digital video signal to be displayed on the panel and a detection signal indicating a connection state of the signal processing apparatus from the signal processing apparatus, a microcomputer for controlling operation of the video display appliance according to the detection signal transmitted from the interface, a scaler for converting a video signal transmitted from the interface to match a resolution of the panel under the control of the microcomputer, and a driving circuit for driving the panel by using the video signal inputted from the scaler. The signal processing apparatus can be detachably connected to the video display appliance.

39 Claims, 9 Drawing Sheets

VIDEO DISPLAY APPLIANCE AND SIGNAL PROCESSING APPARATUS DETACHABLY CONNECTED THERETO

BACKGROUND OF THE INVENTION

1. Field of the Invention

The present invention relates to a video display appliance with a separated signal processing unit receiving a video signal inputted from an external signal source, and more particularly, to a video display appliance from which a video signal processing unit and a PC signal processing unit are separated and to which the separated signal processing units are detachably connected or connected by a communication cable.

2. Description of the Related Art

Due to the recent developments to the field of the video display appliances, such as LCD projectors, several products providing new technology and various functions have been released in the market. Due to these functions that have been previously unused in the past, the dimension and weight of the product have increased.

The construction of a conventional LCD video display appliance will now be described with reference to FIG. 1.

As shown in FIG. 1, the LCD video display appliance includes three external jacks (not shown), a video signal processing unit 106 for processing signals each inputted from the respective jacks, a scaler/microcomputer 130 for converting signals transmitted from the signal processing unit 106 to match a resolution of the LCD panel, and a driving circuit 140 for driving the LCD panel.

The signal processing unit 106 includes a video decoder 110 receiving and processing a video signal 100, such as CVBS, S-video or YPbPr, a deinterlacer 112, an A/D converter 120 receiving and processing a PC signal, and a TMDS (Transition Minimized Differential Signaling) receiver 122 receiving and processing a DVI (Digital Visual Interface) signal.

As described above, most LCD projectors are adapted to be connected to various AV appliances and PCs, as well as the ability to receive TV signals. In order to receive the input signal from various appliances, the projector is provided at a rear side or a lateral side thereof with several jacks for various input sources, such as CVBS, YPbPr, S-video, sound, PC signal, DVI signal and the like. However, due to various jacks and signal processing units for processing the various input signals, the design of the product is more complicated, and the weight and manufacturing cost of the product are significantly increased.

SUMMARY OF THE INVENTION

Accordingly, the present invention is directed to a video display appliance with a separated signal processing unit receiving a video signal inputted from an external signal source that substantially obviates one or more problems due to the limitations and disadvantages of the related art.

It is an object of the present invention to provide a video display appliance with a separated signal processing unit receiving a video signal inputted from an external signal source, thereby minimizing a noise influence.

Another object of the present invention is to provide a signal processing apparatus detachably connected to a video display appliance to transmit a video signal or PC signal to the video display appliance.

Still another object of the present invention is to provide a signal processing apparatus connected to a detachable video display appliance by a communication cable to transmit a video signal or PC signal to the video display appliance.

To achieve these objects and other advantages and in accordance with the purpose of the invention, as embodied and broadly described herein, there is provided a video display appliance for displaying a video signal, which is inputted from a signal processing apparatus externally connected to the video display appliance, on a panel, the video display appliance comprising: an interface receiving a digital video signal to be displayed on the panel and a detection signal indicating a connection state of the signal processing apparatus from the signal processing apparatus; a microcomputer for controlling operation of the video display appliance according to the detection signal transmitted from the interface; a scaler for converting the video signal transmitted from the interface to match a resolution of the panel under the control of the microcomputer; and a driving circuit for driving the panel by using the video signal inputted from the scaler; wherein the signal processing apparatus is detachably connected to the video display appliance.

Preferably, the interface supplies a desired level of driving voltage from a power source of the video display appliance to a signal processing apparatus.

The signal processing apparatus includes a video signal input unit receiving a video signal from an external signal source; a video decoder for decoding the video signal inputted from the video signal input; a deinterlacer for converting the video signal for interlaced scanning inputted from the video decoder into a video signal for non-interlaced scanning; a PC signal input unit receiving a video signal and a control signal from an external PC in an analog form; an A/D converter for converting the signals inputted from the PC signal input unit into digital signals to output the converted signals to the video display appliance; and a detecting circuit for detecting the driving voltage supplied from the video display appliance and outputting the detection signal, which indicates the connection of the signal processing apparatus to the video display appliance, to the video display appliance.

The signal processing apparatus further includes a DVI signal input unit receiving a TMDS converted DVI signal from the external signal source, and a TMDS receiver for inversely converting the video signal received from the DVI signal input unit to output the inversely TMDS converted signal to the video display appliance.

According to another aspect of the present invention, there is provided a video display appliance for displaying a video signal, which is inputted from a signal processing apparatus, on a panel, the video display appliance comprising: an interface receiving a digital video signal converted in a TMDS format to be displayed on the panel and a detection signal indicating a connection state of the signal processing apparatus, from the signal processing apparatus; a TMDS receiver for inversely converting the signal transmitted from the interface; a microcomputer for controlling operation of the video display appliance according to the detection signal transmitted from the TMDS receiver; a scaler for converting a video signal transmitted from the TMDS receiver to match a resolution of the panel under the control of the microcomputer; and a driving circuit for driving the panel by using the video signal inputted from the scaler, wherein the signal processing apparatus is connected to the video display appliance through a communication cable.

The signal processing apparatus includes a video signal processing unit for converting the video signal inputted from an external signal source into a digital signal to output the converted signal to the video display appliance; a PC signal processing unit for converting a video signal and a control signal inputted from a PC into digital signals to output the converted signals to the video display appliance; and a detecting circuit for detecting the driving voltage supplied from the video display appliance and outputting the detection signal, which indicates connection of the signal processing apparatus to the video display appliance, to the video display appliance.

The video signal processing unit includes a video signal input unit receiving a video signal from an external signal source; a video decoder for decoding the video signal inputted from the video signal input; a deinterlacer for converting the video signal for interlaced scanning inputted from the video decoder into a video signal for non-interlaced scanning; and a TMDS transmitter for converting the video signal transmitted from the deinterlacer into a TMDS format to output the TMDS converted signal to the video display appliance.

The PC signal processing unit includes a PC signal input unit receiving a video signal and a control signal from an external PC in an analog form; an A/D converter for converting the signals inputted from the PC signal input unit into digital signals to output the converted signals to the video display appliance; and a TMDS transmitter for converting the signal transmitted from the A/D converter into a TMDS format to output the TMDS converted signal to the video display appliance.

According to further another aspect of the present invention, there is provided a signal processing apparatus detachably connected to a video display appliance, the apparatus comprising: a video signal input unit receiving a video signal from an external signal source; a video decoder for decoding the video signal inputted from the video signal input; and a deinterlacer for converting the video signal for interlaced scanning inputted from the video decoder into a video signal for non-interlaced scanning.

According to still another aspect of the present invention, there is provided a signal processing apparatus detachably connected to a video display appliance, the apparatus comprising: a PC signal input unit receiving a video signal and a control signal from an external PC in an analog form; and an A/D converter for converting the signals inputted from the PC signal input unit into digital signals to output the converted signals to the video display appliance.

The signal processing apparatus further comprises a DVI signal input unit receiving a TMDS converted DVI signal from the external signal source, and a TMDS receiver for inversely converting the video signal received from the DVI signal input unit to output the inversely TMDS converted signal to the video display appliance.

According to still another aspect of the present invention, there is provided a signal processing apparatus detachably connected to a video display appliance, the apparatus comprising: a video signal input unit receiving a video signal from an external signal source; a video decoder for decoding the video signal inputted from the video signal input; a deinterlacer for converting the video signal for interlaced scanning inputted from the video decoder into a video signal for non-interlaced scanning; a PC signal input unit receiving a video signal and a control signal from an external PC in an analog form; an A/D converter for converting the signals inputted from the PC signal input unit into digital signals to output the converted signals to the video display appliance; a DVI signal input unit receiving a TMDS converted DVI signal from the external signal source; and a TMDS receiver for inversely converting the video signal received from the DVI signal input unit to output the inversely TMDS converted signal to the video display appliance.

According to still another aspect of the present invention, there is provided a signal processing apparatus connected to a video display appliance by a communication cable, the apparatus comprising: a video signal input unit receiving a desired video signal from an external signal source; a video decoder for decoding the video signal inputted from the video signal input; a deinterlacer for converting the video signal for interlaced scanning inputted from the video decoder into a video signal for non-interlaced scanning; and a TMDS transmitter for converting the video signal received from the deinterlacer to output the TMDS converted signal to the video display appliance.

According to still another aspect of the present invention, there is provided a signal processing apparatus connected to a video display appliance by a communication cable, the apparatus comprising: a PC signal input unit receiving a video signal and a control signal from an external PC in an analog form; an A/D converter for converting the signals inputted from the PC signal input unit into digital signals to output the converted signals to the video display appliance; and a TMDS transmitter for converting the video signal received from the PC signal input unit into a TMDS format to output the TMDS converted signal to the video display appliance.

Preferably, the signal processing apparatus further includes a DVI signal input unit receiving a TMDS converted DVI signal from the external signal source, and the DVI signal inputted from the DVI signal input unit is outputted to the video display appliance.

According to still another aspect of the present invention, there is provided a signal processing apparatus connected to a video display appliance by a communication cable, the apparatus comprising: a video signal input unit receiving a desired video signal from an external signal source; a video decoder for decoding the video signal inputted from the video signal input; a deinterlacer for converting the video signal for interlaced scanning inputted from the video decoder into a video signal for non-interlaced scanning; a PC signal input unit receiving a video signal and a control signal from an external PC in an analog form; an A/D converter for converting the signals inputted from the PC signal input unit into digital signals to output the converted signals to the video display appliance; and a TMDS transmitter for converting the video signal received from the PC signal input unit into a TMDS format to output the TMDS converted signal to the video display appliance.

Preferably, the signal processing apparatus further includes a DVI signal input unit receiving a TMDS converted DVI signal from the external signal source, and the DVI signal inputted from the DVI signal input unit is outputted to the video display appliance.

The signal processing apparatus further comprises a power supply supplied with a driving voltage from the video display appliance to which the signal processing apparatus is connected, and a detecting circuit for detecting the driving voltage supplied from the video display appliance through the power supply and outputting a desired detection signal, which indicates connection of the signal processing apparatus to the video display appliance, to the video display appliance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, an example of which is illustrated in the accompanying drawings.

First Embodiment

Figure 1:
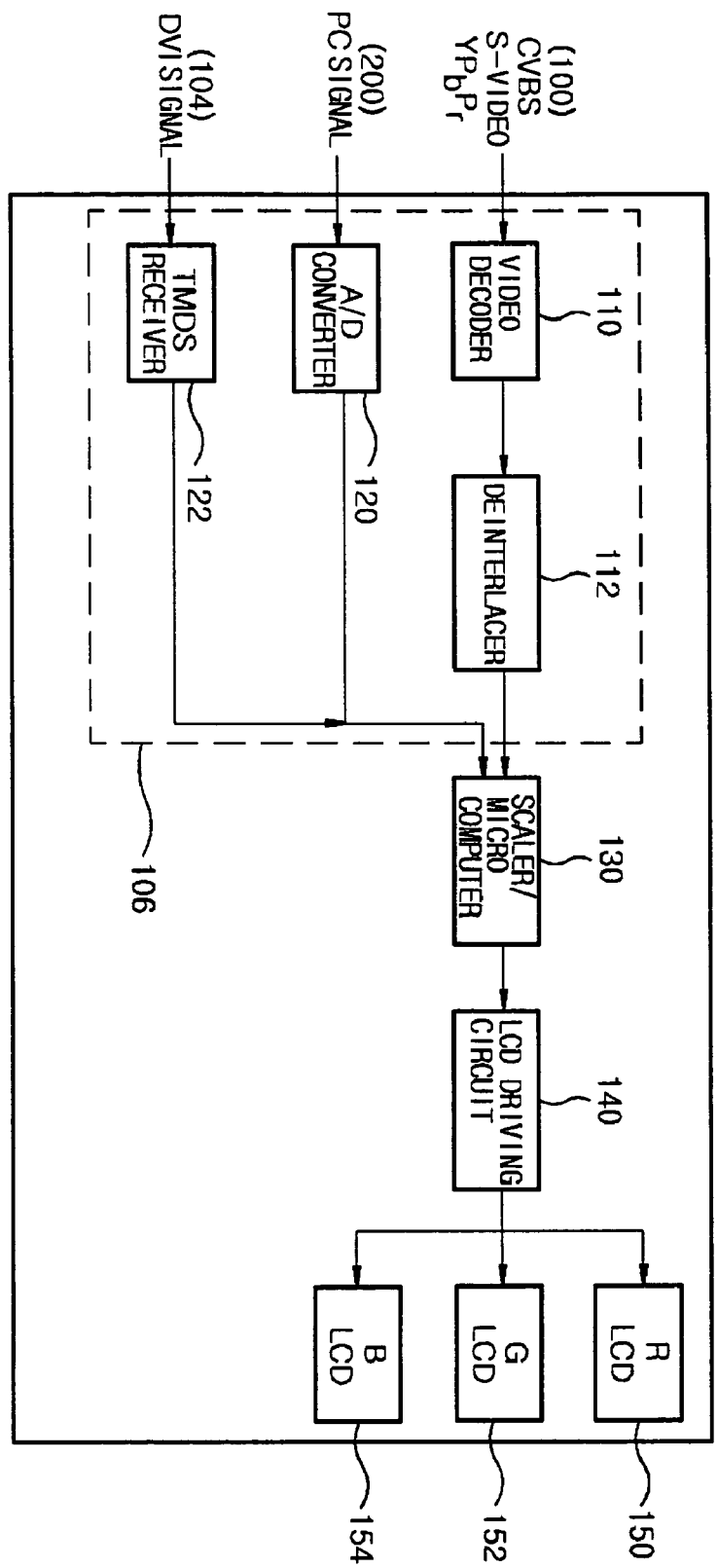
FIG. 1 is a schematic diagram of a conventional video display appliance.
Figure 2:
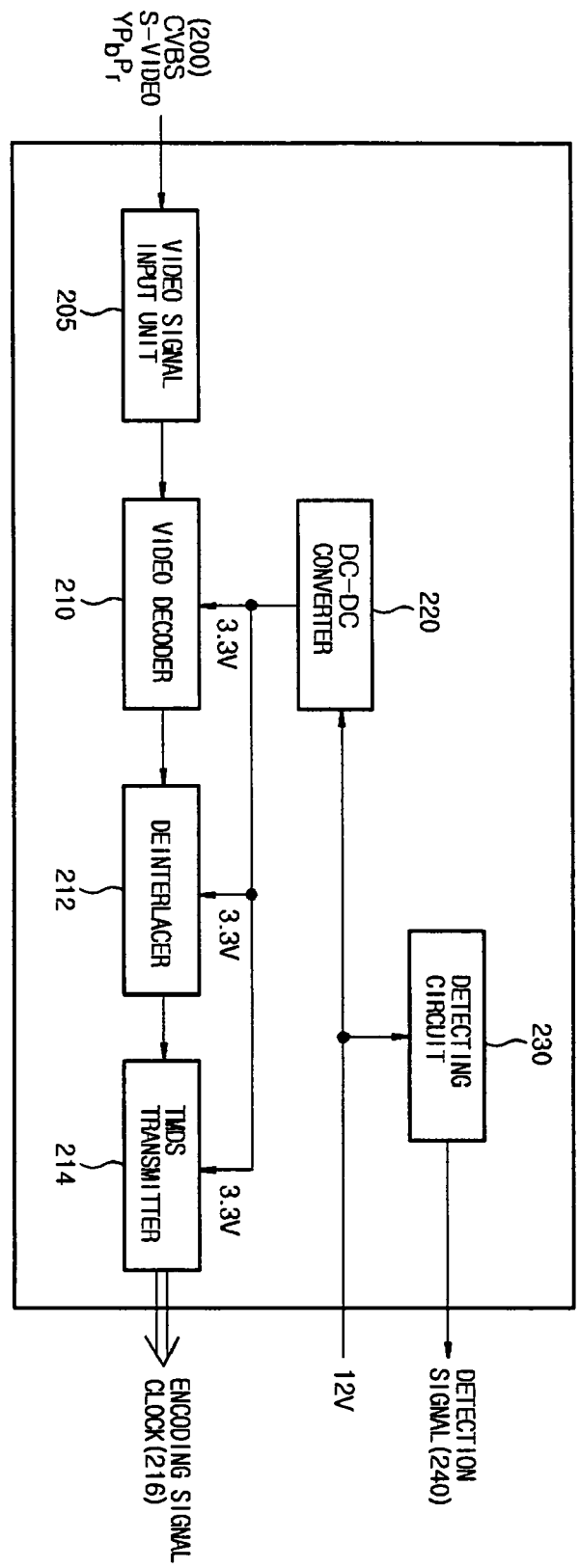
FIG. 2 is a block diagram of a video signal processing apparatus connected to a detachable video display appliance according to a first embodiment of the present invention.
Figure 3:
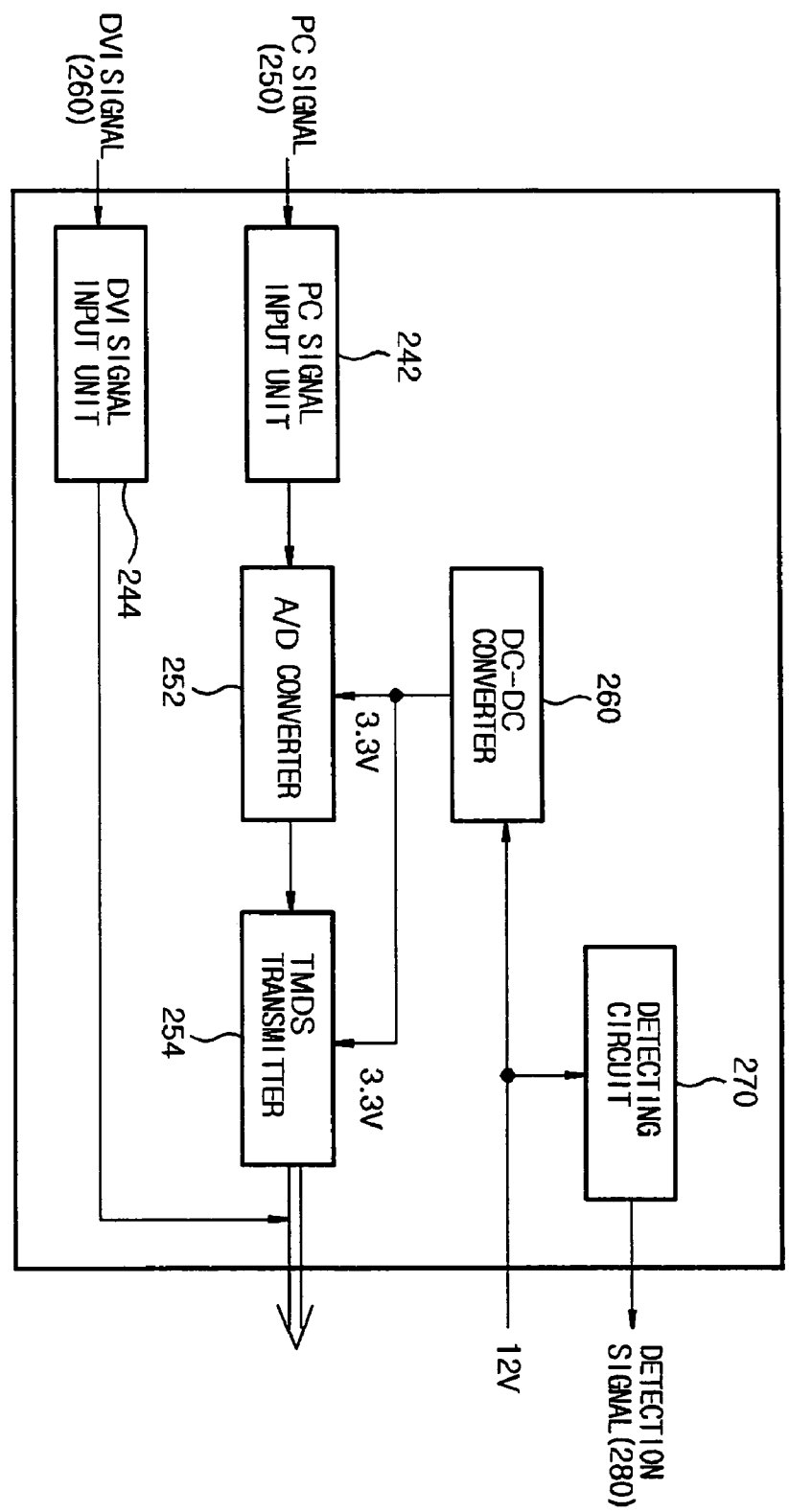
FIG. 3 is a block diagram of a PC signal processing apparatus connected to a detachable video display appliance according to a first embodiment of the present invention.
Figure 4:
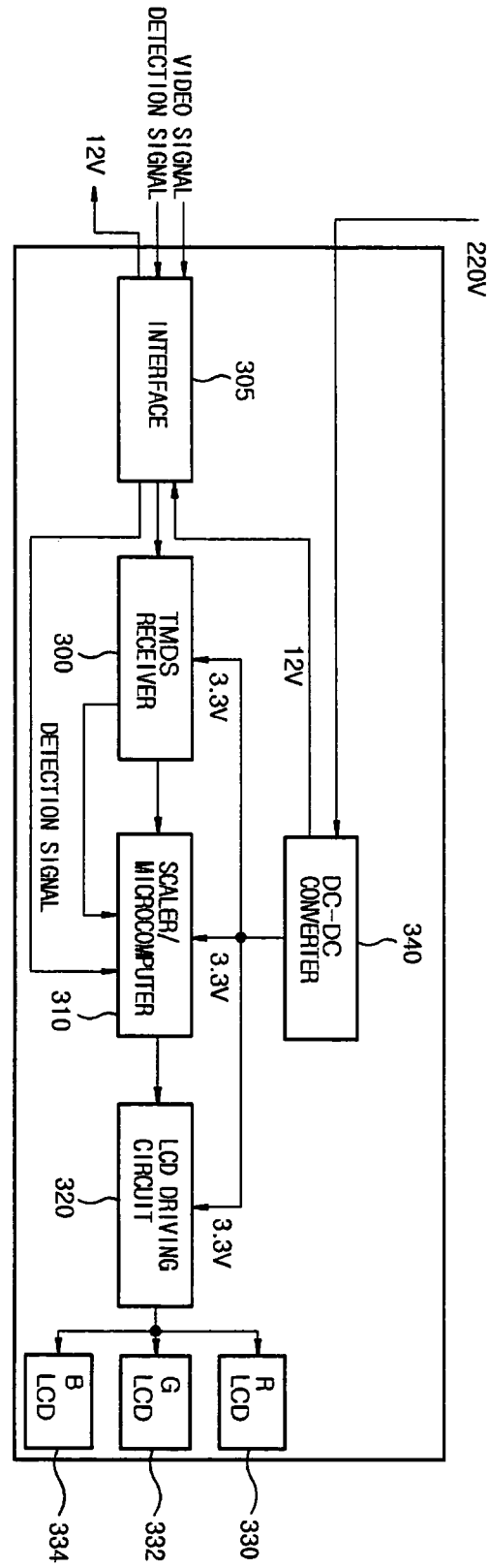
FIG. 4 is a block diagram of a detachable video display appliance according to a first embodiment of the present invention.

The construction and operation of a video display appliance from which a signal processing apparatus is separated, according to a first preferred embodiment of the present invention, will now be described with reference to FIGS. 2 to 4. FIG. 2 is a block diagram of a video signal processing apparatus separated from the video display appliance according to an embodiment of the present invention. FIG. 3 is a block diagram of a PC signal processing apparatus separated from the video display appliance according to an embodiment of the present invention. FIG. 4 is a block diagram of a video display appliance from which a video signal and a PC signal processing apparatus are separated. The detachable video display appliance according to the present embodiment may be connected to a desired signal processing apparatus, such as the video signal processing apparatus or the PC signal processing apparatus, by use of a communication cable.

The construction and operation of the video signal processing apparatus according to the present invention will now be described with reference to FIG. 2.

As shown in FIG. 2, the video signal processing apparatus includes a video signal input unit 205, a video decoder 210, a deinterlacer 212, a TMDS transmitter 214, a DC-DC converter 220 and a detecting circuit 230.

The video signal input unit 205 receives a video signal 200, such as CVBS, S-video or YPbPr, from the external signal source. The video decoder 210 decodes the signal inputted from the video signal input unit 205. The deinterlacer 212 deinterlaces the input signal by converting a video signal for interlaced scanning into a video signal for non-interlaced scanning.

The TMDS transmitter 214 encodes the deinterlaced video signal in a TMDS format to transmit the encoded signal to a video display appliance. The video signal processing apparatus transmits the TMDS converted signal and a clock signal 216 to the video display appliance through a communication cable, thereby transmitting the signals at high speed without a noise influence.

The video signal processing apparatus has no power source for driving an IC, and is supplied with a driving voltage of 12 volts from the video display appliance by means of the DC-DC converter 220 of a power supply. The video signal processing apparatus converts the supplied driving voltage into a desired level of voltage and applies it to each IC.

If the video signal processing apparatus is connected to the video display appliance and receives the driving voltage from the video display appliance, the detecting circuit 230 detects the driving voltage and outputs the detection signal 240, which indicates the connection of the video signal processing apparatus to the video display appliance, to the video display appliance.

The construction and operation of a conventional PC signal processing apparatus will now be described with reference to FIG. 3.

As shown in FIG. 3, the PC signal processing apparatus includes a PC signal input unit 242, a DVI signal input unit 244, an A/D converter 252, a TMDS transmitter 254, a DC-DC converter 260 and a detecting circuit 270.

The PC signal input unit 242 receives a video signal and a control signal from the external PC in an analog form. The A/D converter 252 converts the signals inputted from the PC signal input unit 242 into digital signals to output the converted signals to the TMDS transmitter 254. The TMDS transmitter 254 converts the signals transmitted from the A/D converter in the TMDS format to output the converted signals to the video display appliance.

The DVI signal input unit 244 receives the TMDS converted DVI signal from the external signal source, and the inputted DVI signal is directly transmitted to the video display appliance, without an additional signal processing step.

The DC-DC converter 260 and the detecting circuit 270 have the same function as that of the DC-DC converter 220 and the detecting circuit 230 of the video signal processing apparatus. A description thereof will be omitted herein.

The construction and operation of the video display appliance, to which the video signal processing apparatus and the PC signal processing apparatus are selectively connected, will now be described with reference to FIG. 4.

The video display appliance includes an interface 305, a TMDS receiver 300, a scaler/microcomputer 310, an LCD driving circuit 320, R/G/B LCDs 330, 332 and 334, and a DC-DC converter 340.

The interface 305 receives a TMDS converted video signal of a digital type and a detection signal indicative of the connection of the signal processing apparatus from the video signal processing apparatus or the PC signal processing apparatus. The interface 305 supplies a desired driving voltage from a power source (not shown) of the video display appliance to a signal processing apparatus connected.

The TMDS receiver 300 inversely converts the TMDS video signal received through the interface 305 to output it to the scaler/microcomputer 310. The TMDS receiver 300 transmits a sync-detection signal to the scaler/microcomputer 310, wherein the sync-detection signal determines whether the signal inputted when the PC signal processing apparatus is connected is a PC signal or a DVI signal. For example, if the input signal is the PC signal, a low signal is inputted. Meanwhile, but if the input signal is the DVI signal, a high signal is inputted.

The scaler/microcomputer 310 is designed by 1-chip of a scaler and a microcomputer, and converts the signal transmitted from the TMDS receiver 300 to match a resolution of an LCD panel to output the converted signal to the LCD driving circuit 320. In addition, the scaler/microcomputer 310 determines whether the detection signal is inputted from the video signal processing apparatus or the PC signal processing apparatus, and commands the signal process, regardless of whether the detection signal is inputted or not. Although the scaler/microcomputer 310 may be utilized with 1-chip IC, the scaler and the microcomputer may be separately utilized.

The LCD driving circuit 320 drives the R/G/B LCDs 330, 332 and 334 in response of the signal transmitted from the scaler/microcomputer 310.

The DC-DC converter 340 converts the inputted power of 225 volts into a voltage of 3.3 volts to supply the converted voltage to each IC, and supplies the voltage of 12 volts to the video signal processing apparatus or the PC signal processing apparatus which is selectively connected to the video display appliance.

The video display appliance according to the first preferred embodiment of the present invention, and the video signal processing apparatus or the PC signal processing apparatus which is selectively connected to the video display appliance may be connected to each other though the communication cable. Since data communication via the communication cable is influenced by noise, the signal is converted in the TMDS format suitable for high transmission without being influenced by noise in order to minimize the influence of noise. After applying to the video display appliance, the signal is inversely converted.

The video signal processing apparatus and the PC signal processing apparatus includes a TMDS transmitter for converting the signals to be transmitted to the video display appliance in the TMDS format. The video display appliance includes a TMDS receiver for inversely converting the signal of TMDS format transmitted from the video signal processing apparatus or the PC signal processing apparatus.

Second Embodiment

The construction and operation of a video display appliance according to a second preferred embodiment of the present invention, and a video signal processing apparatus or PC signal processing apparatus which is selectively detached to the video display appliance will now be described in detail with reference to FIGS. 5 to 8.

Figure 5:
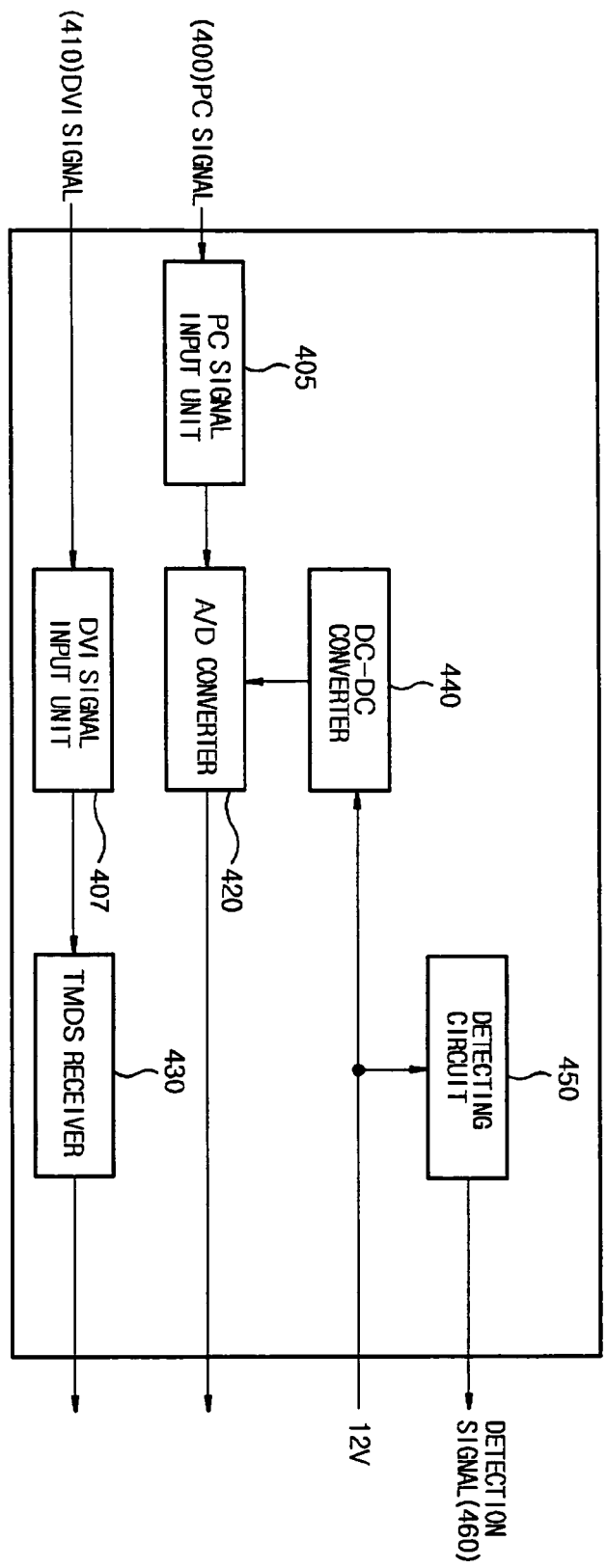
FIG. 5 is a block diagram of a PC signal processing apparatus connected to a detachable video display appliance according to a second embodiment of the present invention.

FIG. 5 is a block diagram of the PC signal processing apparatus detachable to the video display appliance according to the present invention.

As shown in FIG. 5, the PC signal processing apparatus includes a PC signal input unit 405, a DVI signal input unit 407, an A/D converter 420, a TMDS transmitter 430, a DC-DC converter 440 and a detecting circuit 450.

The PC signal input unit 405 receives a video signal and a control signal from the external PC in analog form. The A/D converter 420 converts the signals inputted from the PC signal input unit 405 into digital signals to output the converted signals to the video display appliance. At that time, the PC signal processing apparatus according to the present invention can be detachably connected to the video display appliance without using a separate communication cable. As a result, no consideration to the influence of noise is needed. Therefore, the PC signal processing apparatus according to the present invention does not require a separate TMDS transmitter for transmitting the PC signal.

The DVI signal input unit 407 receives the TMDS converted DVI signal from the external signal source. The TMDS receiver 430 inversely converts the DVI signal inputted from the DVI signal input unit 407 to output the converted DVI signal to the video display appliance. At that time, since the DVI signal 410 is a signal converted in the TMDS format, the signal has to be inversely converted.

The DC-DC converter 440 receives a voltage of 12 volts from the video display appliance and converts the inputted voltage into a desired voltage suitable for driving each IC of the PC signal processing apparatus to supply the converted voltage to each IC. At that time, since each IC of the PC signal processing apparatus is generally driven by 3.3 volts, the DC-DC converter 440 converts the voltage of 12 volts supplied from the exterior into 3.3 volts to output it to the A/D converter 420 and the TMDS receiver 430.

Figure 8:
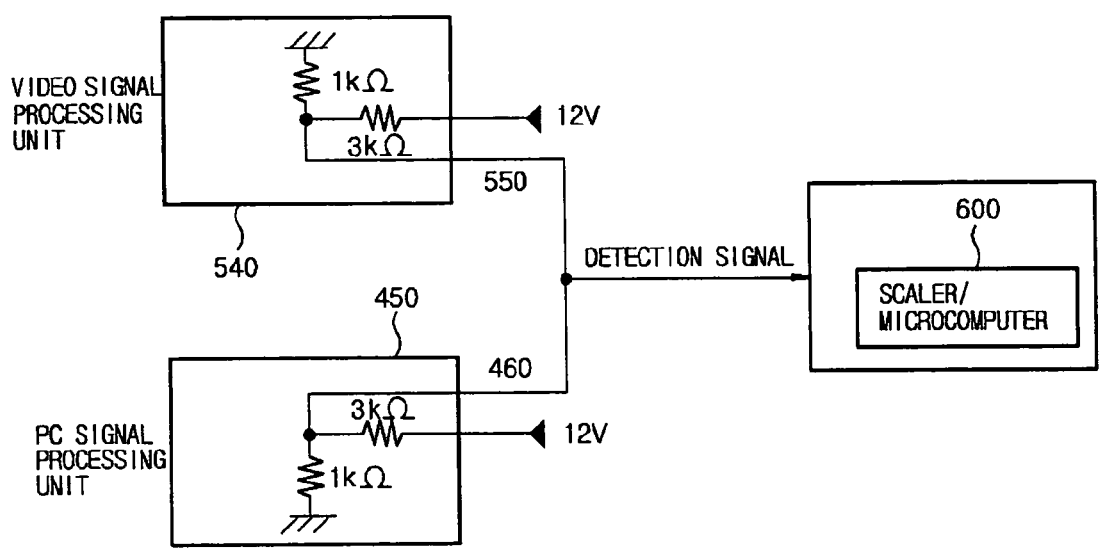
FIG. 8 is a circuit diagram illustrating the construction and operation of a detecting circuit according to the present invention.

The detecting circuit 450 outputs the detection signal, which indicates the connection of the PC signal processing apparatus to the video display appliance, to the video display appliance. The detecting circuit 450 consists of a plurality of resistors, as shown in FIG. 8, and outputs the detection signal of a desired level of voltage to the video display appliance according to the voltage supplied from the video display appliance, as shown in FIG. 8.

The construction and operation of the video signal processing apparatus detachable to the video display appliance according to the present invention will now be described with reference to FIG. 6.

Figure 6:
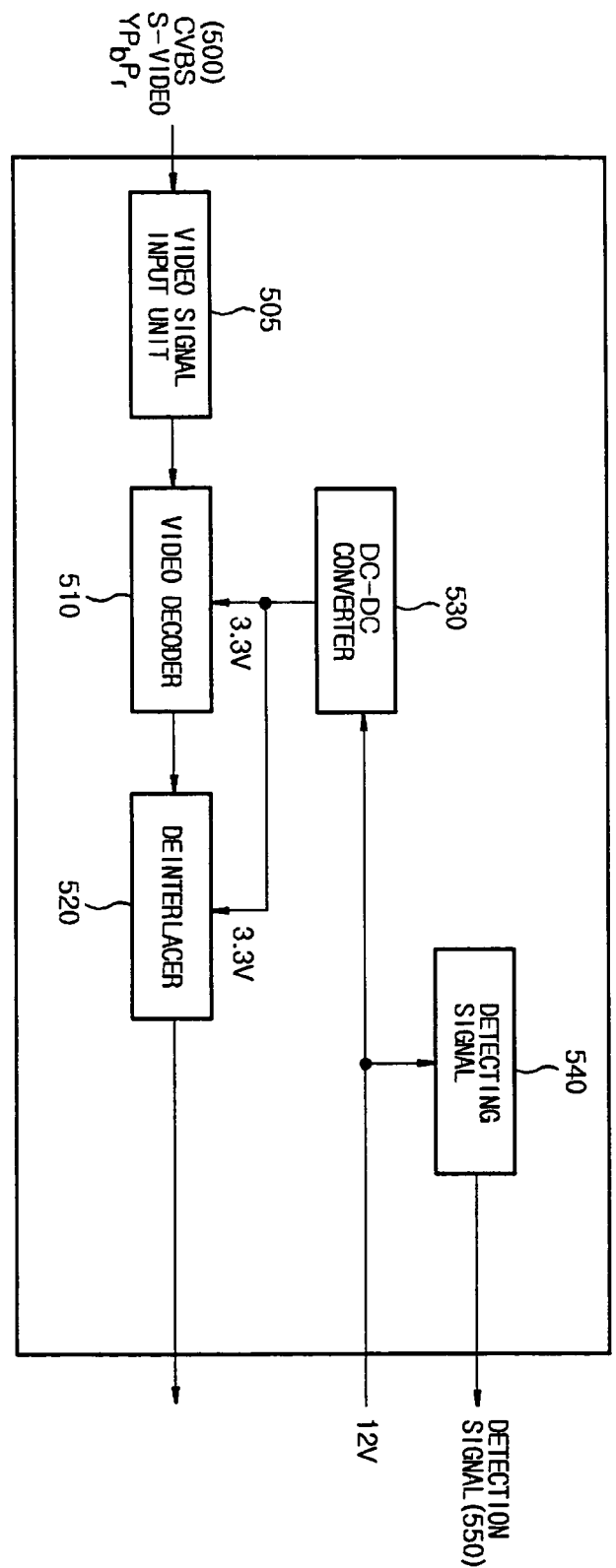
FIG. 6 is a block diagram of a video signal processing apparatus connected to a detachable video display appliance according to a second embodiment of the present invention.

The video signal processing apparatus includes, as shown in FIG. 6, a video signal input unit 505, a video decoder 510, a deinterlacer 520, a DC-DC converter 530 and a detecting circuit 540.

The video signal input unit 505 receives a video signal, such as CVBS, S-video or YPbPr, from the external signal source. The video decoder 510 decodes the signal inputted from the video signal input unit 505 to output the decoded signal to the deinterlacer 520.

The deinterlacer 520 is connected to the video decoder 510, and deinterlaces the signal inputted from the video decoder to output the interlaced signal to the video display appliance.

The DC-DC converter 530 and the detecting circuit 540 have the same construction and operation as those of the PC signal processing apparatus. The description thereof will be omitted therein.

Figure 7:
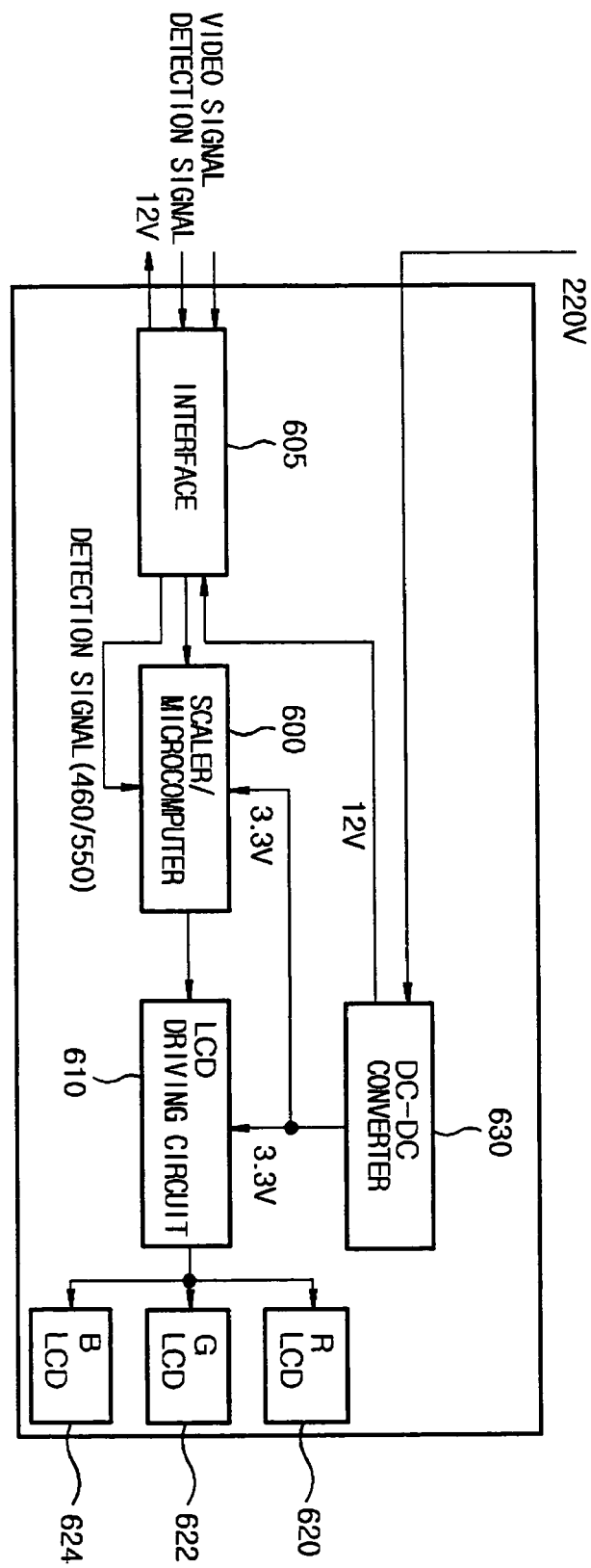
FIG. 7 is a block diagram of a detachable video display appliance according to a second embodiment of the present invention.

Referring to FIG. 7, the video display appliance according to the present invention includes an interface 605, a scaler/microcomputer 600, an LCD driving circuit 610, R/G/B LCDs 620, 622 and 624, and DC-DC converter 630.

The interface 605 receives a digital video signal and detection signals 460 and 550 from the video signal processing apparatus or the PC signal processing apparatus, and transmits a desired driving voltage from a power source (not shown) of the video display appliance.

The scaler/microcomputer 600 converts the video signal inputted through the interface 605 to match a resolution of an LCD panel, in response to the detection signals 460 and 550 transmitted from the interface 605, to output the converted signal to the LCD driving circuit 610. At that time, the scaler/ microcomputer 310 may be utilized with 1-chip IC, and the scaler and the microcomputer may be separately utilized.

The LCD driving circuit 610 outputs the video signal transmitted from the scaler/microcomputer 600 to the R/G/B LCDs 620, 622 and 624 to drive the LCD panel.

The DC-DC converter 630 converts the voltage of 220 volts inputted from the external power source into a desired level of voltage (for example, 3.3 volts) suitable for driving each IC of the video display appliance to supply the converted voltage to each IC. In addition, the DC-DC converter 630 supplies the voltage (for example, 12 volts) to drive the video signal processing apparatus or the PC signal processing apparatus which is selectively connected to the video display appliance.

The detection signal inputted to scaler/microcomputer 600 of the video display appliance according to the present invention will now be described in detail with reference to FIG. 8.

The detection signal is a signal indicating the connection of the video signal processing apparatus or PC signal processing apparatus to the video display appliance, and is inputted from the video signal processing apparatus or PC signal processing apparatus to the video display appliance.

The detecting circuit 540 of the video signal processing apparatus and the detecting circuit 450 of the PC signal processing apparatus consist of a plurality of resistors, as shown in FIG. 8, and outputs a desired level of voltage to the corresponding detecting circuit if the video display appliance is connected.

Specifically, if the video signal processing apparatus or PC signal processing apparatus is connected to the video display appliance, the apparatus is supplied with 12 volts from the video display appliance. The voltage is divided by the resistors of the detecting circuit and then is supplied to the microcomputer of the video display appliance. The microcomputer recognizes the voltages 550 and 460 inputted from the video signal processing apparatus or the PC signal processing apparatus as the detection signal.

Third Embodiment

The construction and operation of a signal processing apparatus capable of being connected to a detachable video display appliance according to a third preferred embodiment of the present invention via a cable will now be described in detail with reference to FIG. 9.

The signal processing apparatus according to the embodiment is provided by integrally forming the video signal processing apparatus and the PC signal processing apparatus, and is connected to the detachable video display appliance via a communication cable.

Figure 9:
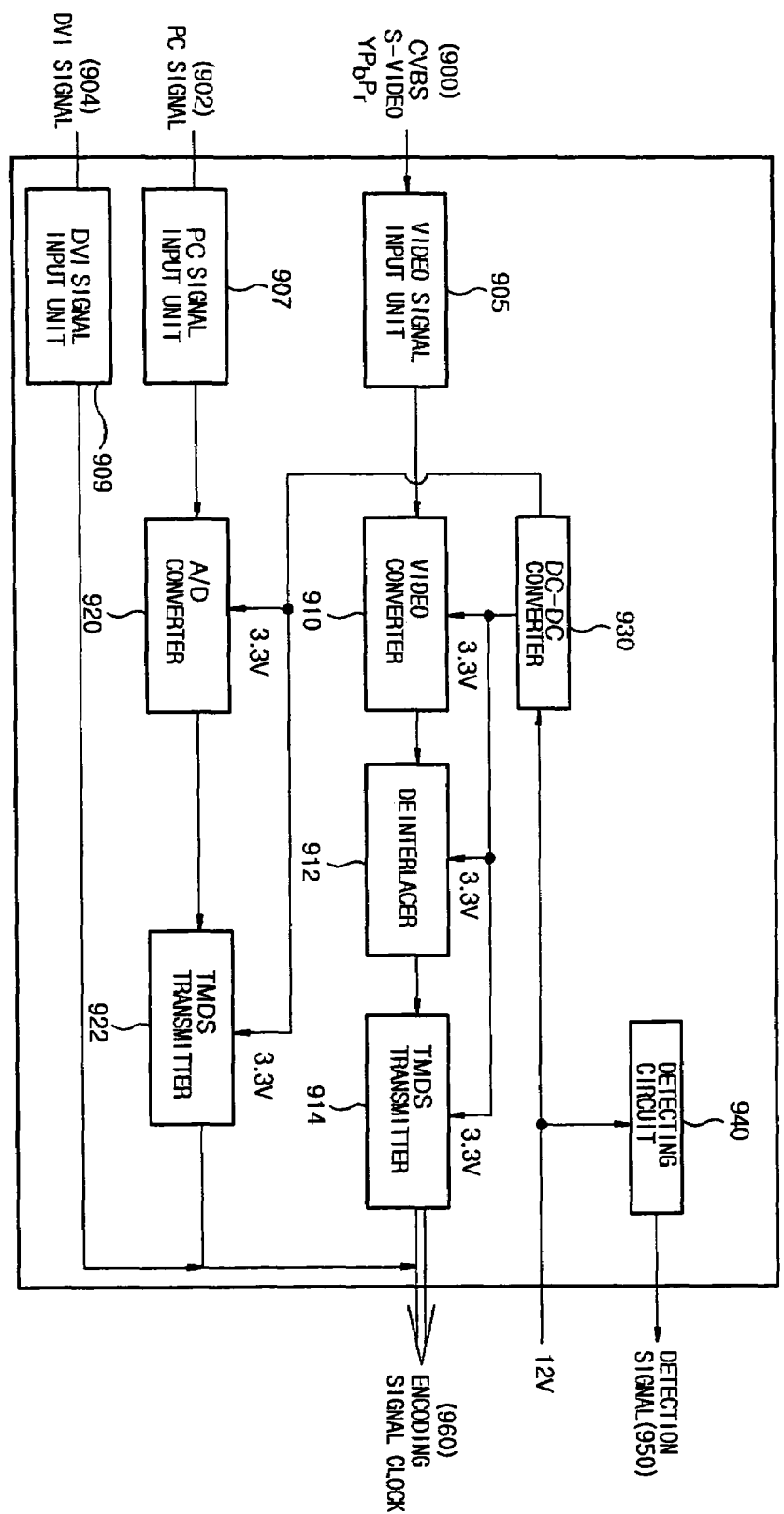
FIG. 9 is a block diagram of a PC/video combined signal processing apparatus connected to a detachable video display appliance according to a third embodiment of the present invention.

FIG. 9 is a block diagram of a signal processing apparatus according to the present invention. The detachable video display appliance to which the signal processing apparatus is connected has the same construction as that shown in FIG. 4.

Referring to FIG. 9, the signal processing apparatus according to the present invention includes a video signal input unit 905 receiving a video signal 900, such as CVBS, S-video or YPbPr, a PC signal input unit 907 receiving an analog PC signal 902, and a DVI signal input unit 909 receiving a TMDS converted DVI signal 904. The signal processing apparatus receives a desired signal from the external signal source through the respective signal inputs 905, 907 and 909.

If the signal processing apparatus according to the embodiment receives the video signal from the external signal source through the video signal input unit 905, it transmits an encoding signal and a clock signal 960 to the video display appliance through the video decoder 910, a deinterlacer 912 and the TMDS transmitter 914.

If the PC signal 902 is inputted through the PC signal input unit 907, the encoding signal and the clock signal 960 are transmitted to the video display appliance through the A/D converter 930 and the TMDS transmitter 922. If the DVI signal 904 is inputted through the DVI signal input unit 909, the signal is transmitted to the video display appliance without implementing a separate signal process.

The signal processing apparatus according to the present embodiment includes a detecting circuit 940 and the DC-DC converter 930. Since the construction and operation thereof are the same as those of the other embodiments, a detailed description thereof will be omitted herein.

Fourth Embodiment

The construction and operation of a signal processing apparatus capable of being connected to a detachable video display appliance according to a fourth preferred embodiment of the present invention will now be described in detail.

The signal processing apparatus according to a fourth preferred embodiment of the present invention is provided by integrally forming the video signal processing apparatus and the PC signal processing apparatus, and is adapted to be connected to the detachable video display appliance.

The detachable video display appliance to which the signal processing apparatus of the present embodiment is connected has the same construction as that shown in FIG. 7.

The signal processing apparatus according to the present embodiment includes a video signal input unit receiving a video signal, such as CVBS, S-video or YPbPr, a PC signal input unit receiving a PC signal, and a DVI signal input unit receiving a DVI signal. The signal processing apparatus receives a desired signal from the external signal source through the respective signal inputs.

If the signal processing apparatus according to the embodiment receives the video signal through the video signal input, it transmits an encoding signal and a clock signal to the video display appliance through a video decoder and a deinterlacer.

If the PC signal is inputted through the PC signal input, the encoding signal and the clock signal are transmitted to the video display appliance through the A/D converter. If the DVI signal is inputted through the DVI signal input, the signal is transmitted to the video display appliance through a TMDS receiver.

The signal processing apparatus according to the present embodiment includes a detecting circuit and a DC-DC converter. Since the construction and operation thereof are the same as those of other embodiments, a detailed description thereof will be omitted herein.

With the above description of the present invention, the video signal processing apparatus and the PC signal processing apparatus may be detached from the video display, so that the video display appliance may be much leaner and lighter. In addition, after the video signal processing apparatus and the PC signal processing apparatus are separated from the video display appliance, they may be detachably connected thereto or connected thereto via the communication cable, thereby providing the detachable video display appliance having no influence to noise while decreasing the number of the devices.

The forgoing embodiment is merely exemplary and is not to be construed as limiting the present invention. The present teachings can be readily applied to other types of apparatuses. The description of the present invention is intended to be illustrative and not to limit the scope of the claims. Many alternatives, modifications, and variations will be apparent to those skilled in the art.

What is claimed is:

1. A video display appliance for displaying a video signal, which is inputted from a signal processing apparatus externally connected to the video display appliance, on a panel, the video display appliance comprising:

an interface receiving a digital video signal to be displayed on the panel and a detection signal indicating a connection state of the signal processing apparatus from the signal processing apparatus;

a microcomputer for controlling operation of the video display appliance according to the detection signal transmitted from the interface;

a scaler for converting the video signal transmitted from the interface to match a first resolution of the panel under the control of the microcomputer when the detection signal indicates connection to a first type of signal processing apparatus, and the scaler for converting the video signal transmitted from the interface to match a second resolution of the panel when the second type of signal processing indicates connection to a second type of signal processing apparatus; and a driving circuit for driving the panel by using the video signal received from the scaler;

wherein the signal processing apparatus is detachably connected to the video display appliance, and the signal processing apparatus includes a video signal processing apparatus for converting the video signal inputted from an external signal source into a digital signal and to output the converted signal to the video disolay appliance and a PC signal processing apparatus for converting a video signal and a control signal inputted from a PC into digital signals and to output the converted signals to the video display appliance, and the scaler determines whether the detection signal is inputted from the video signal processing apparatus or the PC signal processing apparatus through the interface, and commands the signal process.

2. The video display appliance as claimed in claim 1, wherein the interface supplies a desired level of driving voltage from a power source of the video display appliance to the signal processing apparatus.

3. The video display appliance as claimed in claim 1, wherein the signal processing apparatus comprises:

a video signal input unit receiving a video signal from an external signal source;

a video decoder for decoding the video signal inputted from the video signal input unit;

a deinterlacer for converting the video signal for interlaced scanning inputted from the video decoder into a video signal for non interlaced scanning;

a PC signal input unit receiving a video signal and a control signal from an external PC in an analog form;

an A/D converter for converting the signals inputted from the PC signal input unit into digital signals to output the converted signals to the video display appliance; and a detecting circuit for detecting the driving voltage supplied from the video display appliance and outputting the detection signal to the video display appliance, the detection signal indicating connection of the signal processing apparatus.

4. The video display appliance as claimed in claim 3, wherein the signal processing apparatus further comprises:

a DVI signal input unit receiving a TMDS converted DVI signal from the external signal source; and a TMDS receiver for inversely converting the video signal received from the DVI signal input unit to output the inversely TMDS converted signal to the video display appliance.

5. The video display appliance as claimed in claim 1, wherein the signal processing apparatus comprises:

a video signal input unit receiving a video signal from an external signal source;

a video decoder for decoding the video signal inputted from the video signal input;

a deinterlacer for converting the video signal for interlaced scanning inputted from the video decoder into a video signal for non interlaced scanning; and a detecting circuit for detecting the driving voltage supplied from the video display appliance and outputting the detection signal, which indicates connection of the signal processing apparatus to the video display appliance, to the video display appliance.

6. The video display appliance as claimed in claim 1, wherein the signal processing apparatus comprises:

a PC signal input unit receiving a video signal and a control signal from an external PC in an analog form;

an A/D converter for converting the signals inputted from the PC signal input unit into digital signals to output the converted signals to the video display appliance; and a detecting circuit for detecting the driving voltage supplied from the video display appliance and outputting the detection signal, which indicates connection of the signal processing apparatus to the video display appliance, to the video display appliance.

7. The video display appliance as claimed in claim 6, wherein the signal processing apparatus further comprises:

a DVI signal input unit receiving a TMDS converted DVI signal from the external signal source; and a TMDS receiver for inversely converting the video signal received from the DVI signal input unit to output the inversely TMDS converted signal to the video display appliance.

8. The video display appliance as claimed in claim 1, wherein the signal processing apparatus comprises:

a video signal input unit receiving the video signal from the external signal source;

a video decoder for decoding the video signal inputted from the video signal input unit; and a deinterlacer for converting the video signal for interlaced scanning inputted from the video decoder into a video signal for non interlaced scanning.

9. The video display appliance as claimed in claim 8, wherein the signal processing apparatus further comprises:

a power supply supplied with a driving voltage from the video display appliance to which the signal processing apparatus is connected; and a detecting circuit for detecting the driving voltage supplied from the video display appliance through the power supply and outputting a desired detection signal, which indicates connection of the signal processing apparatus to the video display appliance, to the video display appliance.

10. The video display appliance as claimed in claim 1, wherein the signal processing apparatus further comprises:

a PC signal input unit receiving the video signal and the control signal from an external PC in an analog form; and an A/D converter for converting the signals inputted from the PC signal input unit into digital signals to output the converted signals to the video display appliance.

11. The video display appliance as claimed in claim 10, wherein the signal processing apparatus further comprises:
- a DVI signal input unit receiving a TMDS converted DVI signal from the external PC; and
- a TMDS receiver for inversely converting the video signal received from the DVI signal input unit to output the inversely TMDS converted signal to the video display appliance.

12. The video display appliance as claimed in claim 1, wherein the signal processing apparatus comprises:
- a video signal input unit receiving the video signal from the external signal source;
- a video decoder for decoding the video signal inputted from the video signal input unit;
- a deinterlacer for converting the video signal for interlaced scanning inputted from the video decoder into a video signal for non interlaced scanning;
- a PC signal input unit receiving the video signal and the control signal from an external PC in an analog form;
- an A/D converter for converting the signals inputted from the PC signal input unit into digital signals to output the converted signals to the video display appliance;
- a DVI signal input unit receiving a TMDS converted DVI signal from the external signal source; and
- a TMDS receiver for inversely converting the video signal received from the DVI signal input unit to output the inversely TMDS converted signal to the video display appliance.

13. The video display apparatus according to claim 1, wherein the second type of signal processing apparatus comprises the PC signal processing apparatus.

14. The video display apparatus according to claim 13, wherein the first type of signal processing apparatus comprises a non-PC signal processing apparatus.

15. The video display apparatus according to claim 14, wherein the non-PC signal processing apparatus supplies the video signal, and the video signal comprises one of a CVBS signal, an S-video signal or a YPbPr signal.

16. The video display apparatus according to claim 1, further comprising a DC-DC converter to receive power from a power source external to the video display appliance and to supply a voltage to the interface such that the interface supplies a desired level of the driving voltage to the signal processing apparatus.

17. The video display apparatus according to claim 16, wherein the DC-DC converter supplies power to each of the microcomputer, the scaler and the driving circuit.

18. A video display appliance for displaying a video signal, which is inputted from a signal processing apparatus, on a panel, the video display appliance comprising:
- an interface receiving a digital video signal converted in a TMDS format to be displayed on the panel and a detection signal from the signal processing apparatus, the detection signal indicating a connection state of the signal processing apparatus, wherein the interface further supplies a desired level of a driving voltage from a power source of the video display appliance to the signal processing apparatus;
- a TMDS receiver for inversely converting the signal transmitted from the interface;
- a microcomputer for controlling operation of the video display appliance according to the detection signal transmitted from the TMDS receiver;
- a scaler for converting a video signal transmitted from the TMDS receiver to match a resolution of the panel under the control of the microcomputer; and
- a driving circuit for driving the panel by using the video signal inputted from the scaler;

wherein the signal processing apparatus is connected to the video display appliance through a communication cable, and the signal processing apparatus includes a video signal processing apparatus for converting the video signal inputted from an external signal source into a digital signal and to output the converted signal to the video display appliance and a PC signal processing apparatus for converting a video signal and a control signal inputted from a PC into digital signals and to output the converted signals to the video display appliance, and the scaler determines whether the detection signal is inputted from the video signal processing apparatus or the PC signal processing apparatus through the interface, and commands the signal process.

19. The video display appliance as claimed in claim 18, wherein the signal processing apparatus further comprising:
- a detecting circuit for detecting the driving voltage supplied from the video display appliance and outputting the detection signal, which indicates connection of the signal processing apparatus to the video display appliance, to the video display appliance.

20. The video display appliance as claimed in claim 19, wherein the video signal processing unit comprises:
- a video signal input unit receiving the video signal from the external signal source;
- a video decoder for decoding the video signal inputted from the video signal input unit;
- a deinterlacer for converting the video signal for interlaced scanning inputted from the video decoder into a video signal for non interlaced scanning; and
- a TMDS transmitter for converting the video signal transmitted from the deinterlacer into a TMDS format to output the TMDS converted signal to the video display appliance.

21. The video display appliance as claimed in claim 19, wherein the PC signal processing unit comprises:
- a PC signal input unit receiving the video signal and the control signal from an external PC in an analog form;
- an A/D converter for converting the signals inputted from the PC signal input unit into digital signals to output the converted signals to the video display appliance; and
- a TMDS transmitter for converting the signal transmitted from the A/D converter into a TMDS format to output the TMDS converted signal to the video display appliance.

22. The video display appliance as claimed in claim 18, wherein the signal processing apparatus further comprises a DVI signal input unit receiving a TMDS converted DVI signal from the external signal source, and the DVI signal inputted from the DVI signal input unit is directly outputted to the video display appliance without implementing additional signal processing.

23. The video display appliance as claimed in claim 18, wherein the video signal processing apparatus comprises:
- a video signal input unit receiving the video signal from an external signal source;
- a video decoder for decoding the video signal inputted from the video signal input unit;
- a deinterlacer for converting the video signal for interlaced scanning inputted from the video decoder into a video signal for non interlaced scanning;
- a TMDS transmitter for converting the video signal transmitted from the deinterlacer into a TMDS format to output the TMDS converted signal to the video display appliance; and a detecting circuit for detecting the driving voltage supplied from the video display appliance and outputting the detection signal, which indicates the connection of the signal processing apparatus to the video display appliance, to the video display appliance.

24. The video display appliance as claimed in claim 18, wherein the signal processing apparatus comprises:
a PC signal input unit receiving the video signal and the control signal from an external PC in an analog form;
an A/D converter for converting the signals inputted from the PC signal input unit into digital signals to output the converted signals to the video display appliance;
a TMDS transmitter for converting the signal transmitted from the A/D converter into a TMDS format to output the TMDS converted signal to the video display appliance; and
a detecting circuit for detecting the driving voltage supplied from the video display appliance and outputting the detection signal, which indicates connection of the signal processing apparatus to the video display appliance, to the video display appliance.

25. The video display appliance as claimed in claim 18, wherein the signal processing apparatus comprises:
a video signal input unit receiving a desired video signal from the external signal source;
a video decoder for decoding the video signal inputted from the video signal input unit;
a deinterlacer for converting the video signal for interlaced scanning inputted from the video decoder into a video signal for non interlaced scanning; and
a TMDS transmitter for converting the video signal received from the deinterlacer to output the TMDS converted signal to the video display appliance.

26. The video display appliance as claimed in claim 18, wherein the signal processing apparatus comprises:
a PC signal input unit receiving the video signal and the control signal from an external PC in an analog form;
an A/D converter for converting the signals inputted from the PC signal input unit into digital signals to output the converted signals to the video display appliance; and
a TMDS transmitter for converting the video signal received from the PC signal input unit into a TMDS format to output the TMDS converted signal to the video display appliance.

27. The video display appliance as claimed in claim 26, wherein the signal processing apparatus further comprises a DVI signal input unit receiving a TMDS converted DVI signal from the external PC, and the DVI signal inputted from the DVI signal input unit is outputted to the video display appliance.

28. The video display appliance as claimed in claim 18, wherein the signal processing apparatus comprises:
a video signal input unit receiving a desired video signal from the external signal source;
a video decoder for decoding the video signal inputted from the video signal input unit;
a deinterlacer for converting the video signal for interlaced scanning inputted from the video decoder into a video signal for non interlaced scanning;
a PC signal input unit receiving the video signal and the control signal from an external PC in an analog form;
an A/D converter for converting the signals inputted from the PC signal input unit into digital signals to output the converted signals to the video display appliance; and
a TMDS transmitter for converting the video signal received from the PC signal input unit into a TMDS format to output the TMDS converted signal to the video display appliance.

29. The video display appliance as claimed in claim 28, wherein the signal processing apparatus further comprises a DVI signal input unit receiving a TMDS converted DVI signal from the external signal source, and the DVI signal inputted from the DVI signal input unit is outputted to the video display appliance.

30. The video display apparatus according to claim 18, wherein the video signal comprises one of a CVBS signal, an S-video signal or a VPbPr signal.

31. The video display apparatus according to claim 18, further comprising a DC-DC converter to receive power from the power source external to the video display appliance and to supply a voltage to the interface such that the desired level of the driving voltage is supplied to the signal processing apparatus.

32. The video display apparatus according to claim 31, wherein the DC-DC converter supplies power to each of the TMDS receiver, the microcomputer, the scaler and the driving circuit.

33. A display system comprising:
a signal processing apparatus receiving a video signal from an external signal source and processing the video signal; and
a video display appliance for displaying the video signal inputted from the signal processing apparatus externally connected to the video display appliance, wherein the video display appliance comprises:
an interface receiving a digital video signal to be displayed on the panel and a detection signal indicating a connection state of the signal processing apparatus from the signal processing apparatus, the interface further to supply a driving voltage to the signal processing apparatus;
a microcomputer for controlling operation of the video display appliance according to the detection signal transmitted from the interface;
a scaler for converting the video signal transmitted from the interface to match a resolution of the panel under the control of the microcomputer; and
a driving circuit for driving the panel by using the video signal inputted from the scaler, wherein the signal processing apparatus is detachably connected to the video display appliance, and the signal processing apparatus includes a video signal processing apparatus for converting the video signal inputted from an external signal source into a digital signal and to output the converted signal to the video display appliance and a PC signal processing apparatus for converting a video signal and a control signal inputted from a PC into digital signals and to output the converted signals to the video display appliance, and the scaler determines whether the detection signal is inputted from the video signal processing apparatus or the PC signal processing apparatus through the interface, and commands the signal process.

34. The display system of claim 33, wherein the video signal comprises one of a CVBS signal, an S-video signal or a YPbPr signal.

35. The display system of claim 33, further comprising a DC-DC converter to receive power from a power source external to the video display appliance and to supply a voltage to the interface such that the interface supplies a desired level of the driving voltage to the signal processing apparatus.

36. The display system of claim 33, wherein the DC-DC converter supplies power to each of the microcomputer, the scaler and the driving circuit.

37. The display system of claim 33, wherein the scaler converts the video signal transmitted from the interface to match a first resolution of the panel when the detection signal indicates connection to a first type of signal processing apparatus, and the scaler converts the video signal transmitted from the interface to match a second resolution of the panel when the detection signal indicates connection to a second type of signal processing apparatus.

38. The display system according to claim 37, wherein the first type of signal processing apparatus comprises the PC signal processing apparatus.

39. The display system according to claim 38, wherein the second type of signal processing apparatus comprises a non-PC signal processing apparatus.

* * * * *